W. JAY.
FUEL FEEDING MEANS FOR AUTOMOBILE ENGINES.
APPLICATION FILED SEPT. 12, 1913.
1,134,457. Patented Apr. 6, 1915.
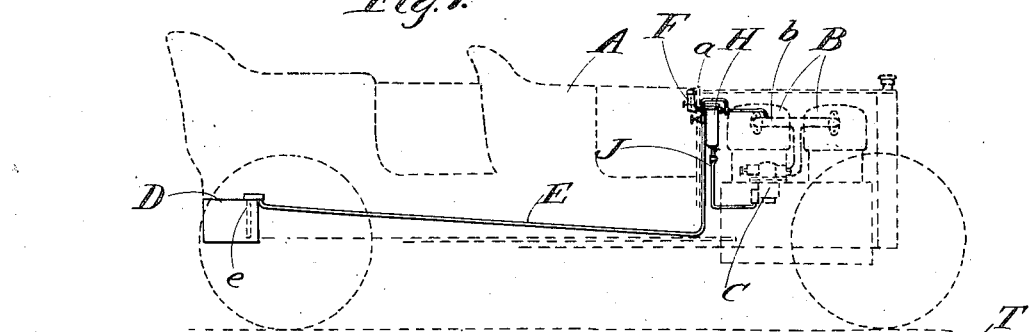
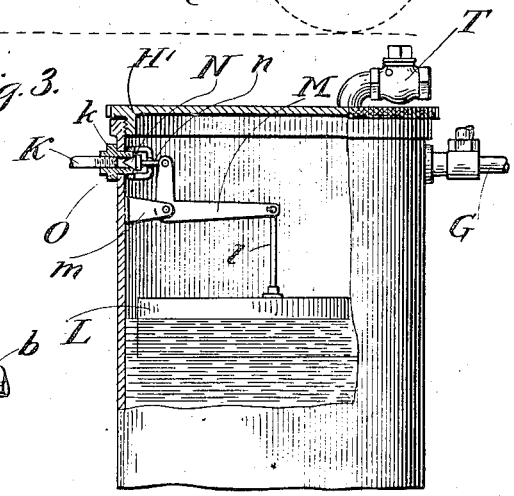
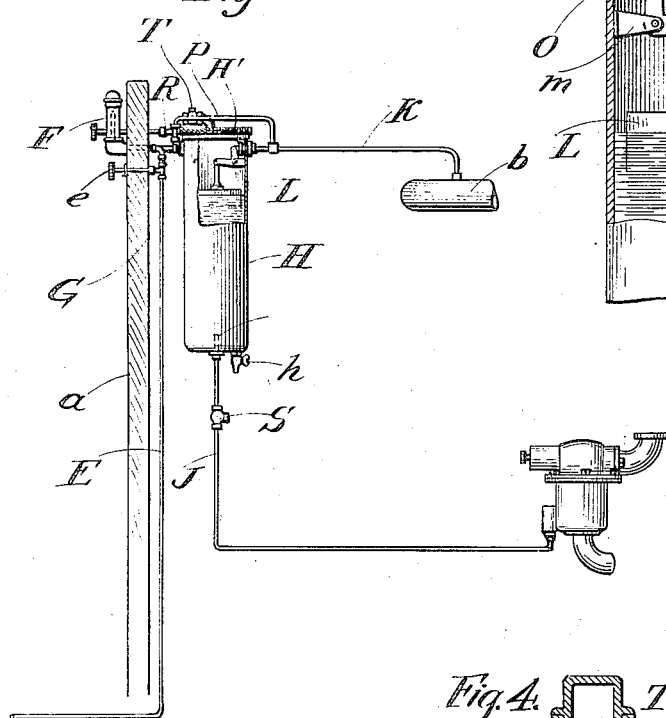
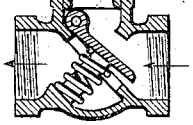
Witnesses:
O. Burnap
Henry A. Parks
Inventor:
Webb Jay
Sheridan, Wilkinson & Scott Att'ys

UNITED STATES PATENT OFFICE.

WEBB JAY, OF CHICAGO, ILLINOIS.

FUEL-FEEDING MEANS FOR AUTOMOBILE-ENGINES.

1,134,457.  Specification of Letters Patent.  Patented Apr. 6, 1915.

Application filed September 12, 1913. Serial No. 789,513.

*To all whom it may concern:*

Be it known that I, WEBB JAY, a citizen of the United States, residing at Chicago, in the county of Cook and State of Illinois, have invented certain new and useful Improvements in Fuel-Feeding Means for Automobile-Engines, of which the following is a specification.

My invention relates in general to improvements in fuel feeding devices for automobile engines.

It consists in the elements and features of construction shown and described, as indicated in the claims.

The construction of many modern automobiles is such that the tank containing the liquid fuel is located below the level of the carbureter, and hence it is necessary to maintain a sufficient pressure in the tank to force the fuel through the conduit leading therefrom to the level of the carbureter. Automatic means have heretofore been provided for maintaining the requisite pressure in the fuel tank, but such means frequently become inoperative, thereby necessitating the almost constant use of a hand pump to produce sufficient pressure in the tank to secure the supply of fuel to the carbureter. Furthermore difficulty often arises through leakage thereby allowing the pressure to escape from the tank so that the fuel will not be forced to the level of the carbureter.

The primary object of my invention is to obviate the necessity for maintaining the fuel supply under pressure when the tank is located below the level of the carbureter, by providing means for automatically transferring a predetermined quantity of fuel from the tank to a point above the carbureter so that it will flow by gravity to the carbureter.

A further object of my invention is to provide an automobile with mechanism for supplying the fuel from the storage tank to the carbureter, which will render it visible to the operator when the supply of fuel has become so nearly exhausted as to require replenishing.

A still further object of my invention is to provide means under the control of the operator, for automatically supplying to the engine cylinders, a richer or more explosive fuel than the mixture normally supplied through the carbureter.

My invention will be more fully disclosed hereinafter with reference to the accompanying drawing, in which the same is illustrated as embodied in a convenient and practical form and in which;

Figure 1 is an elevational view of my invention, the relation thereof to an automobile being indicated by showing the outline of the automobile in dotted lines; Fig. 2 is an enlarged vertical section through the dashboard of an automobile, showing the position relatively thereto of my invention, and Fig. 3 is a detail view on an enlarged scale showing the upper portion of the supplemental fuel supply receptacle. Fig. 4 is an axial section of a valve, T, shown in side elevation in Fig. 3.

The same reference characters are used to designate the same parts in the several figures of the drawing.

Reference A indicates an automobile of any suitable construction, the same being shown in dotted lines. The engine cylinders are also indicated in dotted lines at B.

C designates a carbureter of any suitable construction for supplying the explosive mixture to the intake of the engine cylinders.

D designates a storage tank for containing a supply of gasolene or other liquid fuel. The tank D is located at a level below the carbureter of the engine cylinders.

The parts above described do not in themselves constitute my invention, as they are such as are commonly in use at the present time. They are, however, illustrated in order that my improvement may be fully disclosed, it being understood that my improvement is not limited in its application to any particular construction of automobile or of the engines and carbureter.

E designates a conduit leading from the fuel tank D to a point slightly in front of the dashboard *a* of the automobile and then extends upwardly along the front surface of the dashboard to a point adjacent the top thereof from which point it extends through the dashboard and projects into a sight feed F supported in any suitable manner upon the inner surface of the dashboard. A conduit G leads from the sight feed F through the dashboard and is connected by a suitable coupling with a supplemental fuel supply receptacle H, the latter being supported in any suitable manner upon the outer surface of the dashboard or in any convenient manner upon the automobile. The receptacle H is preferably provided with a removable cap H' to permit access to the interior of the receptacle. Extending from the bottom of the receptacle H is a conduit J which communicates with the carbureter C for supplying thereto the liquid fuel to form the explosive mixture to be delivered from the carbureter to the engine intake. The conduit J preferably extends upwardly a short distance within the receptacle H so as to form a water trap in the bottom of the receptacle.

$h$ indicates a pet-cock for permitting water trapped in the bottom of the receptacle H to be drained therefrom.

K designates a conduit communicating with the interior of the receptacle H adjacent the top thereof and leading to the manifold $b$ of the engine. Located within the receptacle H is a float L connected by a rod $l$ with one arm of a bell crank lever M. The bell crank lever M is suitably fulcrumed within the receptacle H by means of the bracket $m$. The short arm of the bell crank lever is connected by a rod $n$ with a valve N which coöperates with a valve seat O, preferably formed integrally with the coupling $k$, which controls the communication between the interior of the engine cylinders and the interior of the receptacle H.

A by-pass conduit P extends from the conduit G around the receptacle H and communicates with the conduit K. The passage-way through the by-pass P is controlled by a valve R which is provided with a valve stem extending through the dashboard so as to be conveniently manipulated by the operator.

The manner of using and operation of my invention are as follows:—The tank D is filled with a supply of gasolene or other fluid fuel. When the automobile is first put into condition for use the receptacle H is also filled with fluid fuel by removing the cap H'. In order to initially start the engine the valve $e$, which controls the passage-way through the conduit E, is opened and the valve R which controls the passage-way through the by-pass P is also opened. The pistons are reciprocated within the engine cylinders either by the hand crank or by a self-starter. The suction created by the reciprocations of the pistons within the cylinders draws gasolene directly from the tank D through the conduit E, sight feed F, by-pass P, conduit K, and manifold $b$ directly into the engine cylinders so that a rich priming fluid is supplied to promote the starting of the explosions in the cylinders. In cold weather the by-pass P may be left open for a sufficient length of time to thoroughly warm the engine cylinders, after which the valve R is closed. During the subsequent operation of the engine the fuel flows by gravity from receptacle H to the carbureter C and is there mixed with the proper proportion of air to form an explosive mixture of the desired consistency. The suction created by the reciprocations of the pistons in the engine cylinders withdraws the air from the top of the receptacle H when the valve N is open, so that the gasolene will be lifted from the supply tank D, through the connecting conduits and sight feed into the top of the receptacle H. When a sufficient quantity of gasolene has in this manner been lifted into the receptacle H to lift the float L to a position in which the valve N will be closed, no further air will be withdrawn from the top of the receptacle H and consequently no more gasolene will be lifted from the tank D into the receptacle H. When the flow of gasolene from the receptacle H to the carbureter has lowered the level in the receptacle sufficiently to allow the float L to fall and the valve N to open, the suction of the engine again effects the lifting of gasolene from the tank D into the receptacle H until the level is restored to that which will close the valve N.

From the foregoing description it will be observed that the operation of the engine itself lifts the fuel from the tank D into the receptable H so that it will flow by gravity to the carbureter, the engine serving to automatically maintain a predetermined quantity of gasolene in the receptacle H. By my invention it is therefore unnecessary to maintain the gasolene in the tank D under pressure, and hence the necessity of providing an air-tight tank and connections therefrom to the carbureter, is avoided. By providing the sight feed F in the conduit leading from the tank D to the receptacle H, the flow of gasolene to the receptacle is at all times visible to the operator and when the operator notices that gasolene is no longer flowing through the sight feed, he knows that the supply tank D is empty and that he must refill the same before the gasolene in receptacle H has been exhausted. This warning enables the operator to continue the running of the car a sufficient distance to have his main supply tank refilled, inasmuch as the gasolene in the receptacle H will be sufficient to run the automobile a considerable distance. There is, therefore, no danger of the entire supply of gasolene becoming exhausted without the operator being warned and hence the inconvenience oftentimes experienced by automobile operators of unexpectedly finding their gasolene supply exhausted, is avoided.

By providing the by-pass P the starting of the engine is facilitated by permitting the operator from his seat to control the supply of the fuel directly to the engine cylinders. The carbureter may therefore be adjusted so as to produce the best mixture for normal running in all kinds of weather, inasmuch as during cold weather the starting of the engine may be facilitated by supplying the pure gasolene around the carbureter directly to the engine cylinders.

By means of my improvement there is no danger of the fuel tank being drained through leakage at the carbureter when the automobile is not running, as is often the case when the tank is kept under pressure or is located at a higher level than the carbureter. In my invention only the limited amount of gasolene in the receptacle H would be lost by such leakage and the supply in the tank D will be protected by the receptacle H.

In order that there may be a free flow of fuel from the receptacle to the carbureter, a normally open valve T may be provided on the receptacle which will allow air to pass into the receptacle to replace the fuel as it flows therefrom to the carbureter, such valve automatically closing when the receptacle communicates with the engine cylinders, owing to the reduced pressure thereby created in the receptacle. In order that the suction of the engine may not lift the fuel from the conduit leading to the carbureter back into the receptacle, a check valve S may be provided in the conduit leading from the receptacle to the carbureter.

In order to obtain the result of lifting the fuel from the main low level tank to the higher receptacle by means of the suction of the engine at the intake stroke of the piston, as described, without impairing the efficiency of the engine by interfering with the proper mixture of air with the liquid fuel in the carbureter, it is practically important that the connection for suction should be made at some point intermediate the carbureter and the engine intake, that is, at some point beyond the high-suction point of the carbureter in the course leading to the engine intake; and this is indicated by making such connection with the manifold. If the connection is made back of the carbureter, that is, back of the constricted point in the carbureter at which by the construction high velocity of the incoming air is produced for taking the oil and intermixing it with the air, the throttling of the air inlet to the carbureter necessary to render the suction efficient for lifting the oil from the low level tank, is liable to reduce the air supply through the carbureter below the point necessary for yielding a properly explosive mixture for the engine.

In the specification and claims, the phrase "intermediate the carbureter and the engine intake" and "independent of the carbureter and the air supply thereto" are to be understood as indicating, when applied to the suction connection, connection at such point as will not cause that part of the carbureter passage which is constricted for causing the high air velocity to be comprised in the suction path from the engine intake to the receptacle.

From the foregoing description it will be observed that I have invented an improved mechanism through which the liquid fuel is supplied to the engine by the use of which the operation of the engine serves to automatically maintain a predetermined quantity of fuel at a point above the level of the carbureter, thereby obviating the necessity of keeping the fuel in the main supply tank under pressure. It will be further observed that by my invention the operator is kept informed as to whether or not his supply of fuel is nearly exhausted, thereby giving him sufficient opportunity to obtain a recharge of fuel before his supply has become completely used up. It will be further observed that by my invention the operator may, at will, permit fuel to be supplied directly to the engine cylinders when occasion requires, as in starting the engine or in warming it in cold weather.

I claim:—

1. In combination with an explosive engine and a carbureter through which the same is supplied with liquid fuel; a main fuel supply tank located below the plane of the engine intake, a supplemental closed fuel supply receptacle extending for containing liquid above the level of such tank; a liquid supply conduit connecting the tank and said receptacle; a suction conduit communicating at one end with the upper part of the receptacle, and at the other end with the engine intake, and connected for the last mentioned communication with the passage by which the carbureter supplies the engine at a point intermediate the carbureter and the engine intake; a liquid feed connection from the receptacle to the carbureter, and automatic means for alternately admitting and excluding atmospheric pressure in the receptacle.

2. In combination with an explosive engine and a carbureter through which it is supplied with liquid fuel, a main fuel supply tank located below the carbureter; a supplemental closed fuel supply receptacle above the level of said tank; a liquid supply conduit leading from the main supply tank to said receptacle for supplying liquid thereto; a suction conduit leading from the upper part of said closed receptacle for communication with the engine intake and connected with the passage thereto from the carbureter for producing partial vacuum in said receptacle by the suction stroke of the piston in the engine cylinder, and means controlled by the level of the liquid in said receptacle for opening and closing the communication of said conduit therewith.

3. In combination with a carbureter for supplying explosive mixture to an engine cylinder, a main fuel supply tank; a closed supplemental fuel supply receptacle located in a plane above said tank and extending above the fuel supply level of the carbureter; a liquid supply conduit leading from said tank to said receptacle; a liquid feed conduit leading from the receptacle to the carbureter; a suction conduit leading from the upper part of said closed receptacle communicating with the engine intake, said suction conduit being independent of the carbureter or the air supply thereto; whereby through the last mentioned conduit the pressure in said receptacle is reduced by the suction created in the engine cylinder; a by-pass conduit connecting the liquid supply conduit with the suction conduit by-passing said receptacle, and a valve for controlling the passageway through said by-pass conduit.

4. In combination with the carbureter of an internal combustion engine, a low-level main fuel-supply tank, a liquid conduit therefrom by which fuel is delivered to the carbureter, comprising an air-containing chamber appurtenant to the liquid passages of said conduit; a suction conduit leading from said air-containing chamber to the engine intake independent of the carbureter or any conduit supplying air thereto; whereby suction caused by the movement of the piston in the engine cylinder tends to produce a partial vacuum in said appurtenant air chamber; and valve devices by which the flow of the liquid through the first mentioned conduit is permitted only in the direction toward the carbureter.

5. In combination with the carbureter of an explosive engine through which it is supplied with liquid fuel, a main fuel-supply tank located below the level of the carbureter; a supplemental fuel receptacle extending for containing fuel above the level of said tank; liquid conducting connection from said tank to said receptacle; a liquid-conducting connection from the receptacle to the carbureter; a suction conduit leading from the upper part of said receptacle and communicating with carbureter discharge passage, intermediate the carbureter and the engine intake; means by which change in the liquid level in the receptacle opens and closes communication of the receptacle with said suction conduit, and automatic means by which the receptacle is alternately afforded and deprived of atmospheric communication above the liquid therein.

6. In combination with the carbureter of an explosive engine through which the same is supplied with liquid fuel, a main fuel supply tank located below the plane of the engine intake; a supplemental closed fuel supply receptacle extended for containing liquid above the level of said tank, and a liquid conduit connecting the tank and said receptacle; a suction conduit connected with said receptacle and communicating with the engine intake, and for such communication connected with the passage leading to said intake from the carbureter whereby a partial vacuum may be produced in said receptacle by the suction stroke of the piston in the engine cylinder; said receptacle having an atmospheric inlet, and a valve which controls said inlet having means by which said valve is caused to be normally open, and adapted to be seated by the inrush of air past it upon relatively light suction or partial vacuum in said receptacle.

In testimony whereof, I have subscribed my name.

WEBB JAY.

Witnesses:
 GEO. L. WILKINSON,
 HENRY A. PARKS.